(12) United States Patent
Lee et al.

(10) Patent No.: US 8,914,903 B1
(45) Date of Patent: Dec. 16, 2014

(54) SYSTEM, METHOD, AND COMPUTER PROGRAM FOR VALIDATING RECEIPT OF DIGITAL CONTENT BY A CLIENT DEVICE

(75) Inventors: John Lee, Miami, FL (US); Nir Levy, Tel Aviv (IL)

(73) Assignee: Amdocs Software System Limited, Dublin (IE)

( * ) Notice: Subject to any disclaimer, the term of this patent is extended or adjusted under 35 U.S.C. 154(b) by 901 days.

(21) Appl. No.: 12/723,547

(22) Filed: Mar. 12, 2010

Related U.S. Application Data (60) Provisional application No. 61/183,836, filed on Jun. 3, 2009.

(51) Int. Cl.
*G06F 21/00* (2013.01)
*G06F 21/10* (2013.01)

(52) U.S. Cl.
CPC ................................. *G06F 21/10* (2013.01)
USPC ................. 726/29; 726/26; 726/27; 726/28; 726/30

(58) Field of Classification Search
CPC ...................................................... G06F 21/10
USPC ..................................... 726/29, 26, 27, 28, 30
See application file for complete search history.

(56) References Cited

U.S. PATENT DOCUMENTS

| | | | |
|---|---|---|---|
| 4,827,508 A | 5/1989 | Shear | 380/4 |
| 4,977,594 A | 12/1990 | Shear | 380/4 |
| 5,050,213 A | 9/1991 | Shear | 380/25 |
| 5,410,598 A | 4/1995 | Shear | 380/4 |
| 5,892,900 A | 4/1999 | Ginter et al. | 395/186 |
| 5,910,987 A | 6/1999 | Ginter et al. | 380/24 |
| 5,915,019 A | 6/1999 | Ginter et al. | 380/4 |
| 5,920,861 A | 7/1999 | Hall et al. | 707/9 |
| 5,940,504 A | 8/1999 | Griswold | 380/4 |
| 5,943,422 A | 8/1999 | Van Wie et al. | 380/9 |
| 5,949,876 A | 9/1999 | Ginter et al. | 380/4 |
| 5,982,891 A | 11/1999 | Ginter et al. | 380/4 |
| 5,999,949 A | 12/1999 | Crandall | 707/532 |
| 6,112,181 A | 8/2000 | Shear et al. | 705/1 |
| 6,157,721 A | 12/2000 | Shear et al. | 380/255 |
| 6,237,786 B1 | 5/2001 | Ginter et al. | 213/153 |
| 6,363,488 B1 | 3/2002 | Ginter et al. | 713/201 |
| 6,389,402 B1 | 5/2002 | Ginter et al. | 705/51 |
| 6,668,325 B1 | 12/2003 | Collberg et al. | 713/194 |
| 6,785,815 B1 | 8/2004 | Serret-Avila et al. | 713/176 |

(Continued)

OTHER PUBLICATIONS

Little et al.; A digital on-demand video service supporting content-based queries; Published in: Proceeding Multimedia '93 Proceedings of the first ACM international conference on Multimedia; 1993; pp. 1-9; ACM Digital Library.*

(Continued)

*Primary Examiner* — Bradley Holder
(74) *Attorney, Agent, or Firm* — Zilka-Kotab, PC (57) ABSTRACT

A system, method, and computer program product are provided for validating receipt of digital content by a client device. In one embodiment, a transmission of digital content over a network to a client device is identified. Additionally, receipt of the digital content by the client device is validated utilizing a system remote from the client device. In another embodiment, it is determined whether actual digital content transmitted over a network to a client device is digital content expected by the client device. Further, the transmission of the actual digital content is validated to a remote third party system, based on the determination.

21 Claims, 8 Drawing Sheets

(56) References Cited

U.S. PATENT DOCUMENTS

| | | | |
|---|---|---|---|
| 6,832,316 B1 | 12/2004 | Sibert | 713/181 |
| 6,950,867 B1 | 9/2005 | Strohwig et al. | 709/224 |
| 6,959,384 B1 | 10/2005 | Serret-Avila | 713/176 |
| 6,973,499 B1 | 12/2005 | Peden et al. | 709/229 |
| 6,985,885 B1 | 1/2006 | Goldberg et al. | 705/37 |
| 7,050,586 B1 | 5/2006 | Shamoon | 380/232 |
| 7,085,839 B1 | 8/2006 | Baugher et al. | 709/229 |
| 7,107,448 B1 | 9/2006 | MacKay et al. | 713/171 |
| 7,124,170 B1 | 10/2006 | Sibert | 709/216 |
| 7,133,845 B1 | 11/2006 | Ginter et al. | 705/51 |
| 7,136,840 B2 | 11/2006 | Pinkas et al. | 705/75 |
| 7,149,899 B2 | 12/2006 | Pinkas et al. | 713/182 |
| 7,152,165 B1 | 12/2006 | Maheshwari et al. | 713/193 |
| 7,213,266 B1 | 5/2007 | Maher et al. | 726/26 |
| 7,233,948 B1 | 6/2007 | Shamoon et al. | 707/9 |
| 7,243,236 B1 | 7/2007 | Sibert | 713/179 |
| 7,266,681 B1 | 9/2007 | Janes | 713/151 |
| 7,313,692 B2 | 12/2007 | Weeks et al. | 713/156 |
| 7,383,570 B2 | 6/2008 | Pinkas et al. | 726/2 |
| 7,406,603 B1 | 7/2008 | MacKay et al. | 713/193 |
| 7,426,495 B1* | 9/2008 | Corless | 705/75 |
| 7,430,670 B1 | 9/2008 | Horning et al. | 713/190 |
| 7,580,988 B2 | 8/2009 | Rudd | 709/217 |
| 7,581,103 B2 | 8/2009 | Home et al. | 713/176 |
| 2001/0011238 A1* | 8/2001 | Eberhard et al. | 705/27 |
| 2001/0016834 A1* | 8/2001 | Yamanaka et al. | 705/40 |
| 2001/0016836 A1 | 8/2001 | Boccon-Gibod et al. | 705/51 |
| 2001/0032312 A1* | 10/2001 | Runje et al. | 713/172 |
| 2001/0042043 A1 | 11/2001 | Shear et al. | 705/51 |
| 2001/0052077 A1* | 12/2001 | Fung et al. | 713/184 |
| 2002/0002674 A1* | 1/2002 | Grimes et al. | 713/156 |
| 2002/0006204 A1* | 1/2002 | England et al. | 380/269 |
| 2002/0007454 A1* | 1/2002 | Tarpenning et al. | 713/156 |
| 2002/0007456 A1* | 1/2002 | Peinado et al. | 713/164 |
| 2002/0012432 A1* | 1/2002 | England et al. | 380/231 |
| 2002/0012445 A1* | 1/2002 | Perry | 382/100 |
| 2002/0013772 A1* | 1/2002 | Peinado | 705/51 |
| 2002/0048369 A1* | 4/2002 | Ginter et al. | 380/277 |
| 2002/0073177 A1* | 6/2002 | Clark et al. | 709/219 |
| 2002/0080969 A1* | 6/2002 | Giobbi | 380/277 |
| 2002/0108050 A1* | 8/2002 | Raley et al. | 713/193 |
| 2002/0112171 A1* | 8/2002 | Ginter et al. | 713/185 |
| 2002/0141584 A1* | 10/2002 | Razdan et al. | 380/203 |
| 2002/0144116 A1* | 10/2002 | Giobbi | 713/168 |
| 2002/0152173 A1* | 10/2002 | Rudd | 705/57 |
| 2002/0161996 A1* | 10/2002 | Koved et al. | 713/150 |
| 2002/0188567 A1* | 12/2002 | Candelore | 705/51 |
| 2003/0004885 A1* | 1/2003 | Banerjee et al. | 705/52 |
| 2003/0014655 A1* | 1/2003 | England et al. | 713/200 |
| 2003/0023564 A1* | 1/2003 | Padhye et al. | 705/54 |
| 2003/0028488 A1* | 2/2003 | Mohammed et al. | 705/59 |
| 2003/0037253 A1* | 2/2003 | Blank et al. | 713/200 |
| 2003/0078853 A1* | 4/2003 | Peinado et al. | 705/26 |
| 2003/0078891 A1* | 4/2003 | Capitant | 705/57 |
| 2003/0079133 A1* | 4/2003 | Breiter et al. | 713/182 |
| 2003/0084003 A1* | 5/2003 | Pinkas et al. | 705/71 |
| 2003/0084306 A1* | 5/2003 | Abburi et al. | 713/188 |
| 2003/0088784 A1* | 5/2003 | Ginter et al. | 713/189 |
| 2003/0105721 A1* | 6/2003 | Ginter et al. | 705/54 |
| 2003/0110133 A1* | 6/2003 | Maritzen et al. | 705/52 |
| 2003/0126086 A1* | 7/2003 | Safadi | 705/51 |
| 2003/0163431 A1* | 8/2003 | Ginter et al. | 705/64 |
| 2003/0174844 A1* | 9/2003 | Candelore | 380/277 |
| 2003/0182475 A1* | 9/2003 | Gimenez | 710/8 |
| 2003/0185125 A1* | 10/2003 | Sako | 369/53.21 |
| 2003/0187801 A1* | 10/2003 | Chase et al. | 705/59 |
| 2003/0191719 A1* | 10/2003 | Ginter et al. | 705/54 |
| 2003/0194092 A1* | 10/2003 | Parks et al. | 380/281 |
| 2003/0194093 A1* | 10/2003 | Evans et al. | 380/282 |
| 2003/0195855 A1* | 10/2003 | Parks et al. | 705/51 |
| 2003/0200313 A1* | 10/2003 | Peterka et al. | 709/225 |
| 2003/0217011 A1* | 11/2003 | Peinado et al. | 705/59 |
| 2004/0054630 A1* | 3/2004 | Ginter et al. | 705/53 |
| 2004/0103305 A1* | 5/2004 | Ginter et al. | 713/200 |
| 2004/0123129 A1* | 6/2004 | Ginter et al. | 713/193 |
| 2005/0027871 A1 | 2/2005 | Bradley et al. | 709/227 |
| 2005/0060584 A1* | 3/2005 | Ginter et al. | 713/201 |
| 2005/0169496 A1* | 8/2005 | Perry | 382/100 |
| 2005/0210275 A1 | 9/2005 | Homing et al. | 713/190 |
| 2007/0100701 A1 | 5/2007 | Boccon-Gibod et al. | 705/21 |
| 2007/0100768 A1 | 5/2007 | Boccon-Gibod et al. | 705/59 |
| 2007/0172041 A1 | 7/2007 | Boccon-Gibod et al. | 379/142.1 |
| 2007/0180519 A1 | 8/2007 | Boccon-Gibod et al. | 726/21 |
| 2007/0185814 A1 | 8/2007 | Boccon-Gibod et al. | 705/51 |
| 2007/0185815 A1 | 8/2007 | Boccon-Gibod et al. | 705/51 |
| 2007/0204078 A1 | 8/2007 | Boccon-Gibod et al. | 710/54 |
| 2008/0034126 A1* | 2/2008 | Baker | 710/11 |
| 2008/0046987 A1 | 2/2008 | Spector | 726/6 |
| 2008/0172718 A1 | 7/2008 | Bradley | 726/1 |
| 2008/0243694 A1* | 10/2008 | Johnson et al. | 705/52 |
| 2009/0029718 A1 | 1/2009 | Nilsson | 455/456.1 |
| 2009/0031431 A1 | 1/2009 | Boccon-Gibod | 726/30 |
| 2009/0037732 A1 | 2/2009 | Boccon-Gibod et al. | 713/168 |

OTHER PUBLICATIONS

Adam et al.; A content-based authorization model for digital libraries; Published in: Knowledge and Data Engineering, IEEE Transactions on (vol. 14, Issue: 2 ); Date of Publication: Mar./Apr. 2002; pp. 296-315; IEEE Xplore.*

"InnoPath: Reinventing Mobile Customer Care," copyright 2010 InnoPath Software, Inc., http://innopath.com/.

"Registered Email, Electronic Signature, Secure Email by RPost," RPost copyright 1999-2010, www.rpost.com.

"Plaxo—your address book for life," copyright 2002-2010 Plaxo Inc., www.plaxo com.

"Microsoft Update," copyright 2010 Microsoft Corporation, http://www.update.microsoft.com/microsoftupdate/v6/default.aspx?ln=en-us.

* cited by examiner

SYSTEM, METHOD, AND COMPUTER PROGRAM FOR VALIDATING RECEIPT OF DIGITAL CONTENT BY A CLIENT DEVICE

RELATED APPLICATION(S)

The present application claims priority to U.S. Provisional Patent Application No. 61/183,836, entitled "Digital Download Certification System And Method" and filed Jun. 3, 2009, which is hereby incorporated by reference.

FIELD OF THE INVENTION

The present invention relates to digital content, and more particularly to the transmission of digital content to client devices.

BACKGROUND

To date, the transfer of digital content between devices via various networks has become a frequent practice. Generally, such a transfer involves a client device requesting (e.g. via a purchase, etc.) digital content, and the digital content being transferred to the client device in response to the request. Unfortunately, there are currently no available techniques for ensuring receipt of the digital content by devices requesting the same.

For example, validation that the digital content was sent to the requesting devices has traditionally only been provided, but not that the digital content was actually received by the requesting devices. This inability to verify receipt of the digital content has resulted in much inefficiency. Just by way of example, refunds for the digital content have customarily been provided simply upon request by the client devices, as a result of the inability to determine whether the refund was requested due to the client devices unsuccessfully receiving the digital content versus the users of such client devices no longer wanting the digital content, not knowing how to use the digital content, etc. As another example, techniques for verifying the client device and/or user which has the digital content have been non-existent. There is thus a need for addressing these and/or other issues associated with the prior art.

SUMMARY

A system, method, and computer program product are provided for validating receipt of digital content by a client device. In one embodiment, a transmission of digital content over a network to a client device is identified. Additionally, receipt of the digital content by the client device is validated utilizing a system remote from the client device. In another embodiment, it is determined whether actual digital content transmitted over a network to a client device is digital content expected by the client device. Further, the transmission of the actual digital content is validated to a remote third party system, based on the determination.

DETAILED DESCRIPTION

Figure 1:
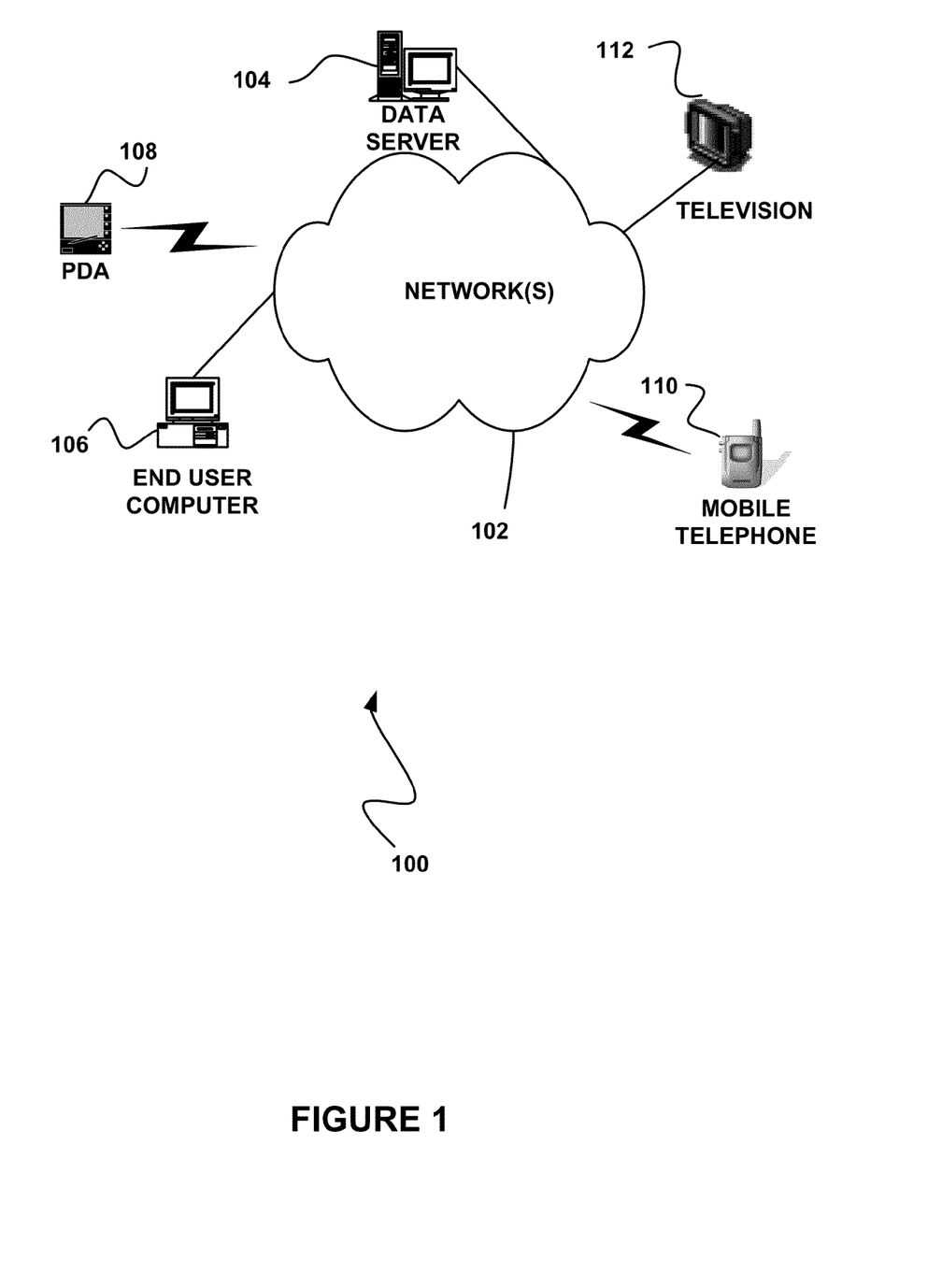
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, a notebook, a tablet computer, an ultra-mobile personal computer, etc.

Figure 2:
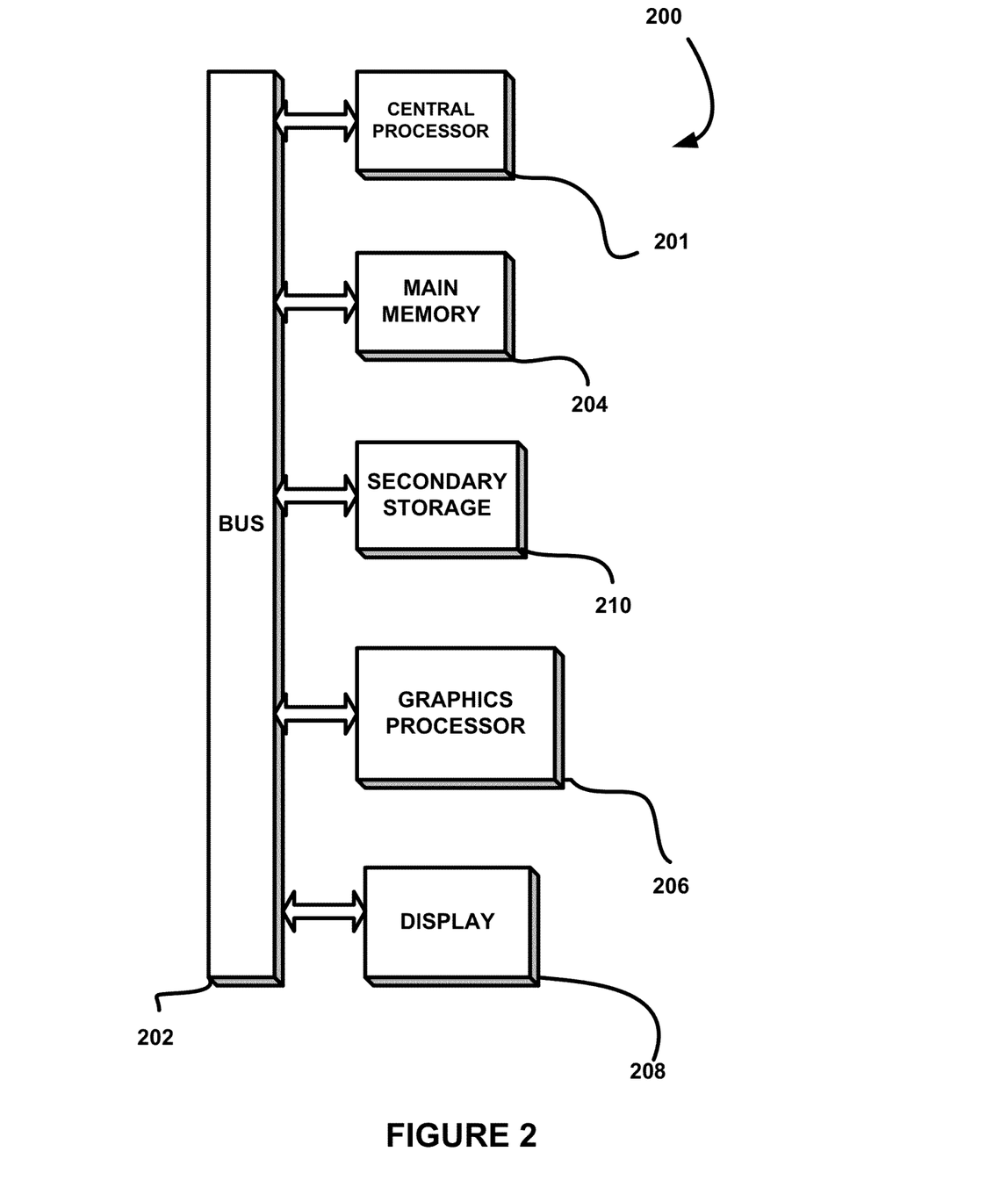
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
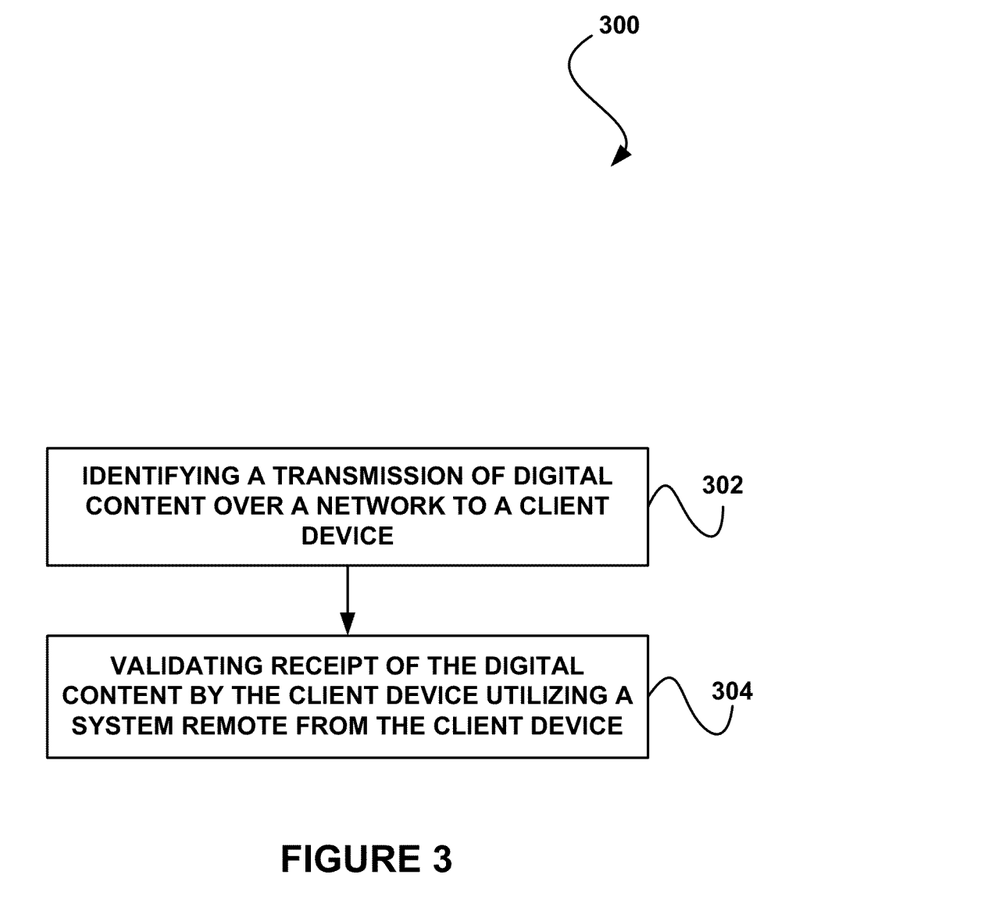
FIG. 3 illustrates a method for validating receipt of digital content by a client device, in accordance with another embodiment.

FIG. 3 illustrates a method 300 for validating receipt of digital content by a client device, in accordance with another embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a transmission of digital content over a network to a client device is identified. It should be noted that the client device may include any of the devices described above with respect to FIGS. 1 and/or 2. For example, the client device may include a desktop computer, a lap-top computer, a PDA device, a mobile phone device, a set-top box, etc. Also, the network over which the digital content is transmitted may include any of the networks described above with respect to FIG. 1 (e.g. a telecommunications network, a wireless network, etc.).

Also, in the context of the present description, the digital content may include any type of content that is in digital form, and thus that is capable of being transmitted (e.g. downloaded or otherwise sent over the network) to the client device. For example, the digital content may include a movie, a song, an application (e.g. software), etc. Optionally, a provider of the digital content may own at least one intellectual property right to the digital content, such as a right to license the digital content, a right to use the digital content, a right to sell the digital content, etc.

As a further option, the transmission of the digital content to the client device may be from the provider of the digital content. For example, the client device may request the digital content from the provider of the digital content, and the provider may in turn transmit the digital content to the client device. To this end, the identification of the transmission may be responsive to a request for the digital content sent from the client device. As an option, such request may include a purchase of the digital content (e.g. an e-commerce transaction) by a user of the client device. It should be noted that the transmission of the digital content may be identified in any desired manner.

In one embodiment, the transmission of the digital content may be identified by confirming an entitlement to the digital content for the client device and/or the user of the client device, in response to the request for the digital content sent from the client device. The entitlement may include a permission for the client device and/or the user of the client device to receive the digital content. For example, upon a confirmation that the client device and/or the user of the client device is entitled to the digital content, the digital content may be transmitted to client device, such that the transmission may be identified.

As an option, the entitlement may be confirmed based on at least one rule associated with the digital content (e.g. as configured by the provider of the digital content). The rule may include a limit on a number of instances of the digital content allowed to be simultaneously maintained by a user of the client device, for example. Thus, with respect to such example, it may be determined that the user of the client device is entitled to the digital content if the number of instances of the digital content presently maintained by the user of the client device does not meet the limit defined by the rule.

As another example, the rule may include a limit on a number of allowed receipts of the digital content by the client device. Accordingly, with respect to the aforementioned example, it may be determined that the user of the client device is entitled to the digital content if the number of previous receipts of the digital content by the client device does not meet the limit defined by the rule.

In various other embodiments, the rule may indicate that only a one-time download of digital content is allowed, that the user/user device is entitled to the digital content for predetermined period of time, that updates to the digital content are free or a predefined cost, etc. Of course, while various examples of confirming the entitlement to the digital content for the client device and/or the user of the client device are described above, such entitlement may be confirmed in any desired manner.

Furthermore, as shown in operation 304, receipt of the digital content by the client device is validated utilizing a system remote from the client device. With respect to the present description, validating the receipt of the digital content by the client device may include any verification, confirmation, etc. by a system remote from the client device that is associated with whether the digital content has been received by the client device. For example, the validation may indicate that the digital content was received by the client device or was not received by the client device.

In one embodiment, the receipt of the digital content may be validated based on a message received by the system from the client device. The message may optionally validate whether the digital content was received by the client device. To this end, the message may indicate that the digital content was received by the client device or was not received by the client device. In this way, the receipt of the digital content may be validated as being received by the client device if the message from the client device indicates the same. Of course, as another option, the receipt of the digital content may be validated as not being received by the client device if the message from the client device indicates the same, if a message is not received from the client device which validates whether the digital content was received by the client device, etc.

As an option, the message may be generated by the client device, and the content of the message may be based on a comparison of actual digital content received by the client device via the above described transmission with digital content expected to be received by the client device. The digital content expected to be received by the client device may optionally be identified by the client device using at least one attribute of the digital content (e.g. a size of the digital content and/or any other identifying attribute of the digital content). Such attribute of the digital content may be provided to the client device in response to the request for the digital content sent from the client device (e.g. prior to the transmission of the digital content, with the transmission of the digital content, etc.) for allowing the client device to validate the receipt of the digital content.

To this end, receipt of digital content by a client device, where such digital content is transmitted over a network to the client device, may be validated utilizing a system remote from the client device. The validation of the receipt of the digital content may be utilized for various purposes, which will be described in more detail below with reference to the remaining figures. In one embodiment, the validation of the receipt of the digital content may be utilized for determining whether a refund for the digital content that is requested by the user of the client device is to be issued. For example, if the validation of the receipt of the digital content indicates that the digital content was not received by the client device, the refund may be automatically issued to the user of the client device. However, if the validation of the receipt of the digital content indicates that the digital content was received by the client device, the refund may be denied from being issued to the user of the client device (e.g. which may reduce fraud associated with users requesting refunds when the digital content has in fact been received), or otherwise evaluated based on a policy configured by the provider of the digital content.

In another embodiment, the validation of the receipt of the digital content may be utilized for applying rules to subsequent requests associated with the digital content sent by the client device and/or the user of the client device to determine entitlement to the digital content for the client device and/or the user of the client device. As noted above, the rules may indicate a limit on a number of instances of the digital content allowed to be simultaneously maintained by a user of the client device, a limit on a number of allowed transmissions of the digital content to the client device and associated receipts by the client device, etc. Thus, by validating that the digital content was received (e.g. as expected) by the client device, such receipt may be utilized when evaluating the rules (e.g. for determining the number of instances of the digital content presently maintained by the user of the client device, for determining the number of receipts of the digital content by the client device, etc.).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
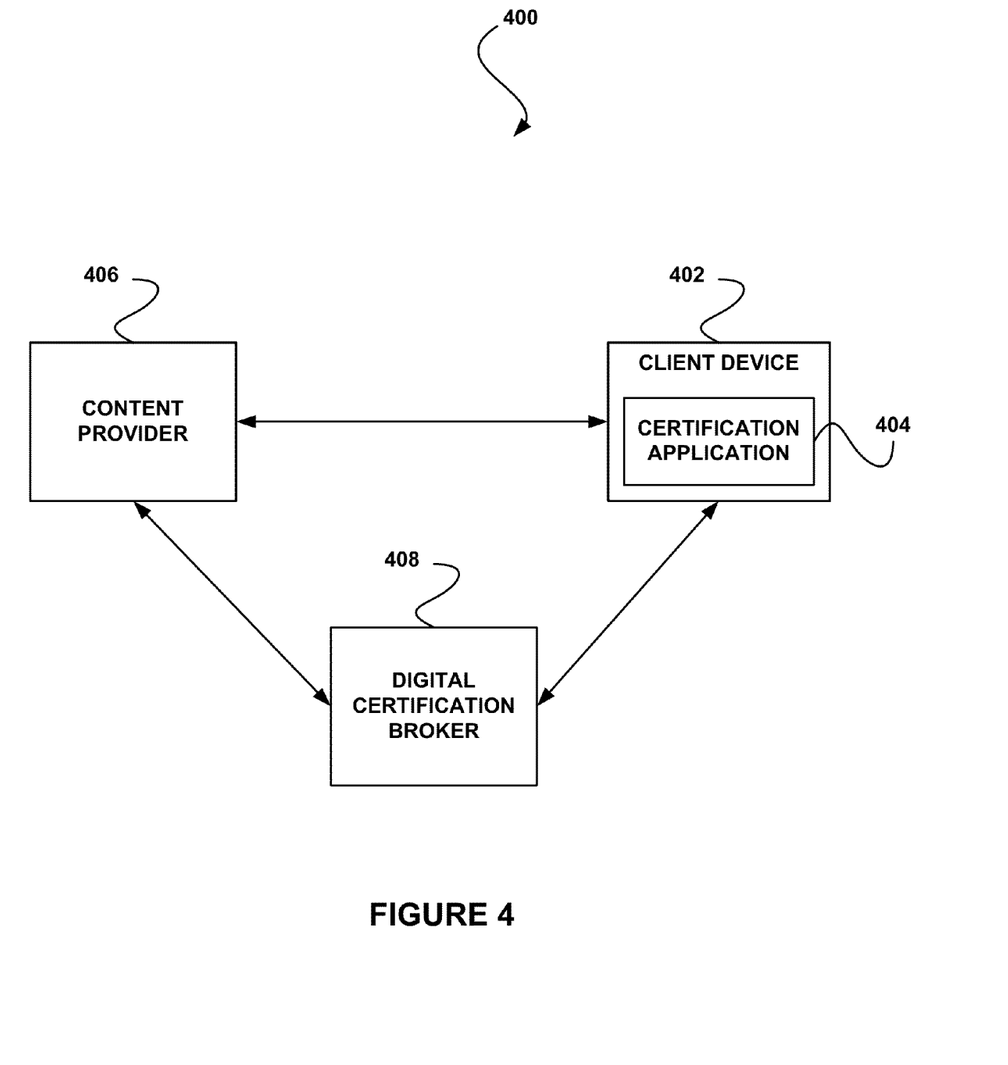
FIG. 4 illustrates a system for validating receipt of digital content by a client device, in accordance with yet another embodiment.

FIG. 4 illustrates a system 400 for validating receipt of digital content by a client device, in accordance with yet another embodiment. As an option, the system 400 may be implemented in the context of the details of FIGS. 1-3. Of course, however, the system 400 may be implemented in any desired environment. Again, the aforementioned definitions may equally apply to the description below.

As shown, a client device 402 is in direct communication with a content provider 406. It should be noted that while only a single client device 402 and a single content provider 406 are shown, any number of various client devices and content providers may be in communication in the manner shown in FIG. 4. Optionally, the client device 402 and the content provider 406 may be in communication via a service provided by a service provider (e.g. a telecommunications service provider, etc.). Further, such communications may optionally be secure.

The content provider 406 may include any provider of digital content, with respect to the present embodiment. For example, the content provider 406 may be capable of providing digital content to the client device 402 by network transmission. The content provider 406 may store the digital content. As another option, the content provider 406 may own at least one right to the digital content, as an option.

With respect to the present embodiment, the client device 402 may send a request to the content provider 406 for digital content. The request may include a purchase the digital content, as an option. Additionally, the request may include an identifier of the client device 402 to which the digital content is to be transmitted.

As also shown, the content provider 406 is in direct communication with a digital certification broker 408. The digital certification broker 408 may include any service (e.g. on a server, etc.) separate from the client device 402 and the content provider 406. Thus, the digital certification broker 408 may include a third party system that is remote from the client device 402 and/or the content provider 406. Again, communications to/from the digital certification broker 408, whether with respect to the client device 402 or the content provider 406) may optionally be secure.

Accordingly, upon receipt of the request, the content provider 406 may send a query to a digital certification broker 408 requesting notification of whether the client device 402 is entitled to the digital content. The request may optionally include any information pertinent to the entitlement determination. For example, the request may include an identifier [e.g. media access control (MAC) address, etc.] of the client device 402 (e.g. as received from the client device 402, via the aforementioned request), an identifier of a user of the client device 402, a security version associated with the client device 402 or any other information necessary for determining whether the client device 402 is entitled to the digital content.

In response to the request, the digital certification broker 408 may confirm that the client device 402 is entitled to the digital content, utilizing rules for the digital content (e.g. stored in a profile for the digital content) as established by the content provider 406. The digital certification broker 408 may then notify the content provider 406 of the entitlement. Upon receipt of the notification of the entitlement, the content provider 406 may transmit the digital content to the client device 402.

As further shown, the client device 402 includes a certification application 404. The certification may be installed as a virtual machine on a chip of the client device 402, may be installed on the operation system of the client device 402, may be Java based, etc., and/or any combination of the above. The certification application 404 may be utilized for automatically validating receipt of the digital content. In one embodiment, the certification application 404 may analyze the actual digital content received by the client device 402 via the transmission from the content provider 406 and may compare the same to digital content expected to be received by the client device 402 via the transmission from the content provider 406.

In one embodiment, the digital content expected to be received by the client device 402 may be identified by the certification application 404 based on at least one attribute of the digital content which is provided to the client device 402 by the content provider 406. For example, the attributes may include a size of the digital content, a hash of the digital content, etc. Accordingly, the certification application 404 may compare the attribute provided by the content provider 406 with a corresponding attribute of the digital content actually received by the client device 402.

If the certification application 404 validates that the actual digital content received by the client device 402 is the same as the digital content expected to be received (e.g. based on the attribute comparison), the certification application 404 may validate that the digital content transmitted from the content provider 406 was received. If, however, the certification application 404 validates that the actual digital content received by the client device 402 is not the same as the digital content expected to be received (e.g. based on the attribute comparison), the certification application 404 may validate that the digital content transmitted from the content provider 406 was not received.

The certification application 404 may then communication the validation to the digital certification broker 408. In this way, the digital certification broker 408 may validate whether the digital content transmitted from the content provider 406 was received by the client device 402, using the validation communicated from the certification application 404 of the client device 402.

Optionally, the validation by the certification application 404 may include generating a message indicating whether the digital content transmitted from the content provider 406 was received by the client device 402. For example, the message may include an end status of the transmission of the digital content. The message may then be sent to the digital certification broker 408 for use by the digital certification broker 408 in validating whether the digital content transmitted from the content provider 406 was received by the client device

402. To this end, the client device 402 may determine whether actual digital content transmitted over a network to the client device 402 is digital content expected by the client device 402, and may validate the transmission of the actual digital content to the digital certification broker 408, based on the determination.

In one embodiment, the digital certification broker 408 may store the validation (e.g. an indication of whether the digital content transmitted from the content provider 406 was received by the client device 402), for subsequent retrieval. For example, if a user of the client device 402 requests a refund for the digital content from the content provider 406, the content provider 406 may query the digital certification broker 408 for an indication of whether the digital content transmitted from the content provider 406 was received by the client device 402. The digital certification broker 408 may then look-up the stored validation for determining whether the digital content was received by the client device 402, and may inform the content provider 406 of a result of the determination.

The content provider 406 may use the indication of whether the digital content transmitted from the content provider 406 was received by the client device 402 to determine whether to issue the refund to the user of the client device 402. For example, the determination of whether to issue the refund may be based on a policy applied to the indication of whether the digital content was received by the client device 402. In this way, the refund may be issued to the user of the client device 402 based on a validation of receipt of the digital content by the client device 402, thus reducing a number of refunds otherwise issued without regard to whether the digital content was actually received by the client device 402. Of course, while the refund is described above with respect to it being requested from the content provider 406, in another embodiment the refund may be requested from a service provider whose service enabled the transmission of the digital content to the client device 402 (e.g. where the transmission failed as a result of a fault of the service of the service provider, etc.).

As another example, if a user of the client device 402 requests a reload of the digital content from the content provider 406, the content provider 406 may query the digital certification broker 408 for an indication of whether the user and/or client device 402 is entitled to the reload of the digital content. The reload of the digital content may include a retransmission of the digital content in a manner such that the user of the client device 402 only has a single instance of the digital content across all client devices presently utilized (e.g. in operation, etc.) by the user. In one embodiment, the reload may include retransmitting the digital content to a same client device 402 as the client device to which the digital content was previously received.

The entitlement determination may be made by the digital certification broker 408 using the stored indication of whether the digital content transmitted from the content provider 406 was received by the client device 402. The entitlement determination may further be based on a rule associated with the digital content indicating whether a reload of the digital content is allowed (and optionally a cost associated with a reload if allowed).

In one embodiment, the rule may indicate that a reload of the digital content is not allowed. Thus, if the digital certification broker 408 has stored an indication that the digital content was not previously received by the client device 402, the digital certification broker 408 may inform the content provider 406 that the entitlement of the client device 402 to reload the digital content is allowed, such that the content provider 406 may transmit the digital content to the client device 402 and optionally charge the client device 402 for the reload (and the certification application 404 may accordingly validate receipt of the digital content). However, if the digital certification broker 408 has stored an indication that the digital content was previously received by the client device 402, the digital certification broker 408 may inform the content provider 406 that the entitlement of the client device 402 to reload the digital content is denied, such that the content provider 406 may not transmit the digital content to the client device 402.

As another example, if a user of the client device 402 requests a restore of the digital content from the content provider 406, the content provider 406 may query the digital certification broker 408 for an indication of whether the user and/or client device 402 is entitled to the restore the digital content. The restore of the digital content may include a retransmission of the digital content in a manner such that the user of the client device 402 has multiple instances of the digital content across client devices presently utilized by the user. In one embodiment, the restore may include retransmitting the digital content to a different client device 402 as the client device to which the digital content was previously received.

The entitlement determination may be made by the digital certification broker 408 using the stored indication of whether the digital content transmitted from the content provider 406 was received by the client device 402 to which the digital content is requested to be restored. The entitlement determination may further be based on a rule associated with the digital content indicating whether a restore of the digital content is allowed (and optionally a cost associated with a restore if allowed, such as a cost reduced from the cost associated with the first transmission of the digital content to a client device 402 of the user).

In one embodiment, the rule may indicate that a restore of the digital content is allowed. Thus, if the digital certification broker 408 has stored an indication that the digital content was not previously received by the client device 402, the digital certification broker 408 may inform the content provider 406 that the entitlement of the client device 402 to restore the digital content is allowed, such that the content provider 406 may transmit the digital content to the client device 402 and optionally charge the client device 402 for the restore (and the certification application 404 may accordingly validate receipt of the digital content).

While various embodiments of the manner in which the stored indication of whether the digital content was received by the client device 402 may be utilized, it should be noted that the validation of the receipt of the digital content by the client device 402 may be utilized in any desired manner. For example, the digital certification broker 408 may track the locations at which the receipt digital content has been validated, for enabling intellectual property protection with respect to the digital content. Additionally, the digital certification broker 408 may update profiles of the users for which the receipt digital content has been validated, by including an indication in such profiles of the digital content received by the users (e.g. for marketing/advertising use, for allowing the user to retrieve digital content to which he is entitled from any allowed location). Further, the digital certification broker 408 may ensure whether a transfer of digital content occurred as expected by the client device 402 in a situation where there is a dispute between the client device 402 and the content provider 406 and/or service provider.

Figure 5:
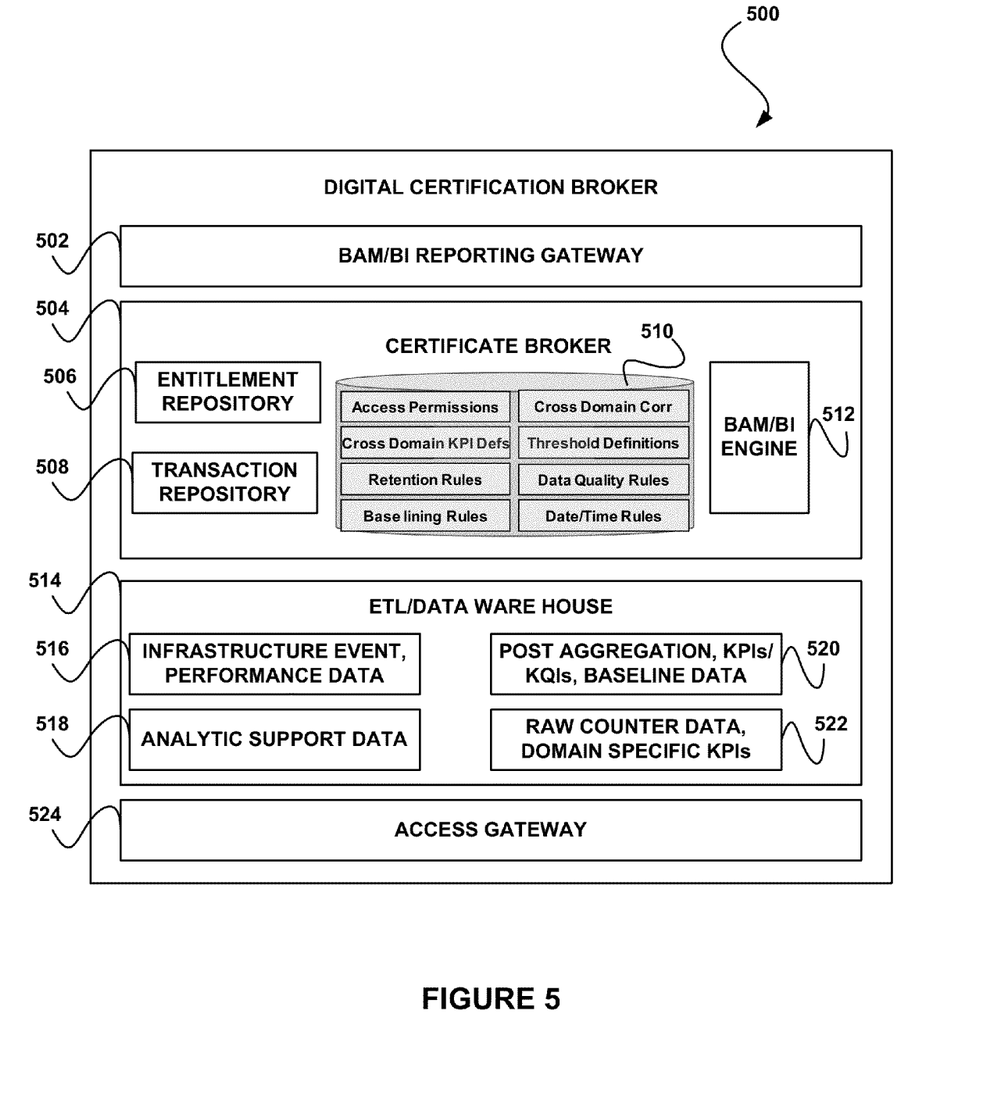
FIG. 5 illustrates a digital certification broker for validating receipt of digital content by a client device, in accordance with still yet another embodiment.

FIG. 5 illustrates a digital certification broker 500 for validating receipt of digital content by a client device, in accordance with still yet another embodiment. As an option, the digital certification broker 500 may be implemented in the context of the details of FIGS. 1-4. For example, the digital certification broker 500 may be implemented with respect to the digital certification broker 408 of FIG. 4. Of course, however, the digital certification broker 500 may be implemented in any desired environment. Again, the aforementioned definitions may equally apply to the description below.

As shown, the digital certification broker 500 includes a business activity management (BAM)/business informatics (BI) reporting gateway 502. The BAM/BI reporting gateway 502 is accessible to content providers (e.g. such as the content provider 406 of FIG. 4). For example, the content providers may query the digital certification broker 500 via the BAM/BI reporting gateway 502 for indications of whether user/client devices are entitled to digital content.

As another example, the BAM/BI reporting gateway 502 may interface with the content providers for reporting information associated with digital content provided by the content providers. The information may optionally include marketing analytics, such as popularity of digital content among users of client devices, content provider rankings for performance and volume, etc. As another option, the information may include asset tracking information, such as an identification of which digital content is on which client device.

The content providers may optionally utilize information reported from the BAM/BI reporting gateway 502 to make enhanced offers based on existing entitlements to digital content. The offers may include a personalization associated with digital content, recommendations for digital content, discounts on digital content, multi-device licenses for digital content, single-device licenses for digital content, temporary licenses for digital content, etc.

The BAM/BI reporting gateway 502 may also be accessible to service providers. The service providers may include entities enabling the transmission of the digital content between the content providers and the client devices. For example, the service providers may provide the networks via which the digital content is transmitted from the content providers to the client devices. In one embodiment, the service providers may use the digital certification broker 500 to perform information (e.g. revenue) assurance with the content providers [e.g. by matching billing records, customer relationship management (CRM) records, etc. to records stored by the digital certification broker 500]. In another embodiment, the service providers may use the digital certification broker 500 to evaluate content provider performance, such as via information associated with transmissions of digital content (e.g. downloads, volumes, defects, refund requests, etc.).

The digital certification broker 500 also includes a certificate broker 504. As shown, the certificate broker 504 includes an entitlement repository 506 for storing entitlements to digital content. The entitlement repository 506 may store information indicating users and/or client devices and the digital content to which they are entitled.

The certificate broker 504 further includes a transaction repository 508 for storing validations of digital content received by client devices. Moreover, the certificate broker 510 includes a database 510 storing rules associated with digital content (e.g. as configured by the content providers). The rules may be stored in a separate profile for each piece of digital content, and may indicate terms and conditions for entitlements to the digital content with which they are associated. For example, the rules may include access permissions, cross domain key performance indicator (KPI) definitions, retention rules, base lining rules, cross domain corrections, threshold definitions, data quality rules, date/time rules, etc.

Additionally, the certificate broker 504 includes a BAM/BI engine 512 for processing (e.g. analyzing, aggregating, filtering, etc.) information stored by the certificate broker 504 (e.g. information in the entitlement repository 506, transaction repository 508 and/or database 510). The BAM/BI engine 512 may allow the processed information to be accessed by (e.g. reported to) the content providers/service providers via the BAM/BI reporting gateway 502.

Still yet, the digital certification broker 500 includes an extract, transform, load (ETL)/Data Warehouse 514. The ETL/Data Warehouse 514 includes infrastructure event/performance data 516, analytic support data 518, post aggregation/KPIs/Key Quality Indicators (KQIs)/baseline data 520, and raw counter data/domain specific KPIs 522.

Moreover, the digital certification broker 500 includes an access gateway 524 which interfaces with the client devices. The access gateway 524 allows the client devices to report validations of receipt of digital content to the digital certification broker 500 (e.g. which may be stored in the transaction repository 508).

Figure 6:
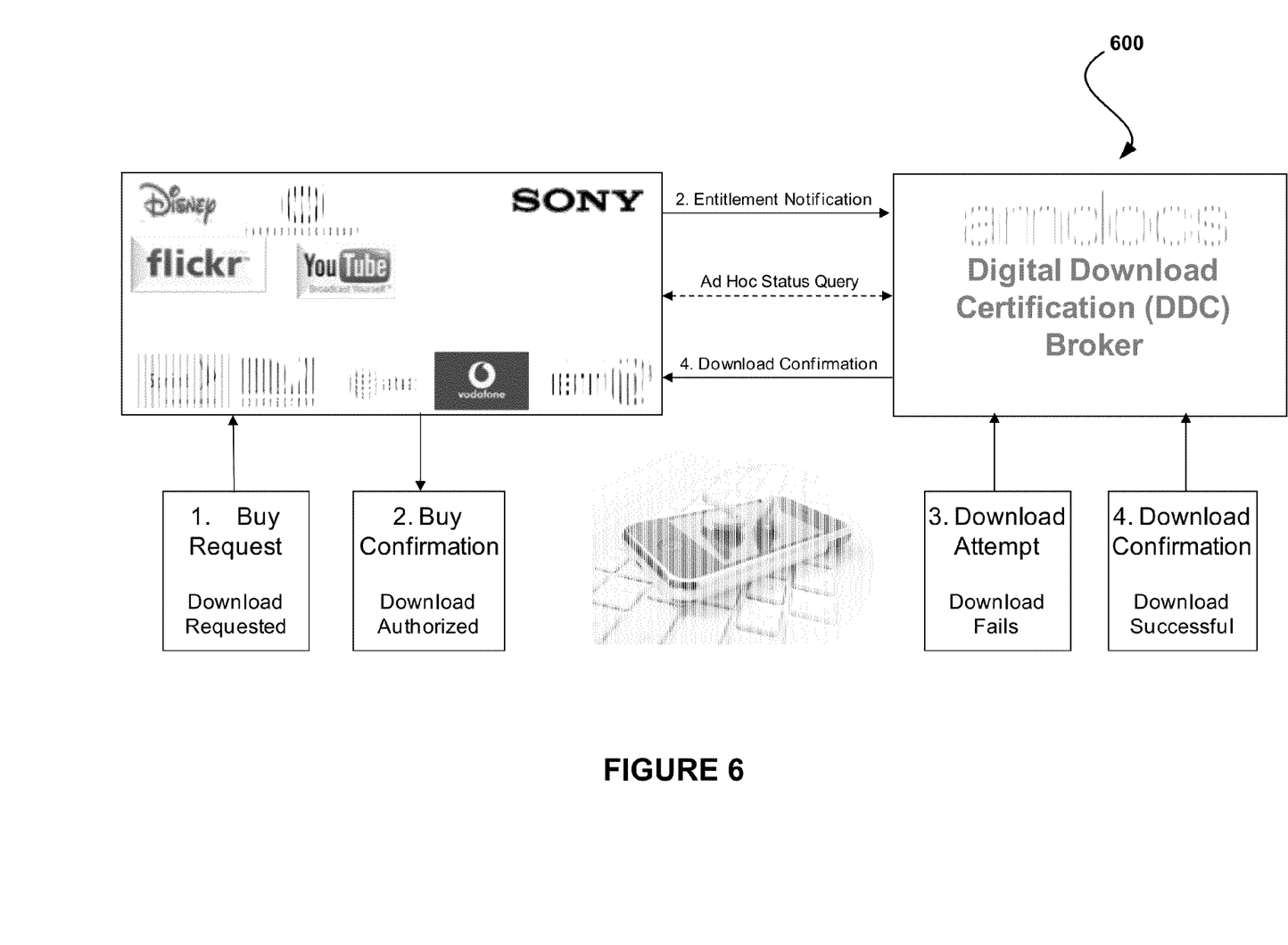
FIG. 6 illustrates a method in which a client device purchases digital content, in accordance with another embodiment.

FIG. 6 illustrates a method 600 in which a client device purchases digital content, in accordance with another embodiment. As an option, the method 600 may be carried out in the context of the details of FIGS. 1-5. Of course, however, the method 600 may be carried out in any desired environment. Yet again, the aforementioned definitions may equally apply to the description below.

As shown, a client device issues a request to buy and download digital content to a content provider via a network of a service provider. The content provider receives the request and transmits an entitlement notification to the digital certification broker [i.e. shown as digital download certification (DDC) broker].

The entitlement notification includes a query requesting an indication of whether the client device is entitled to the digital content. The digital certification broker determines whether the client device is entitled to the digital content (e.g. based on previous validations of receipt of the digital content by the client device, rules associated with the digital content, etc.), and responds to the content provider with the determination. The content provider may optionally send a status query to the digital certification broker before receipt of the determination made by the digital certification broker.

The content provider then either allows the download of the digital content to the client device if the determination is that the client device is entitled to the digital content, or denies the download of the digital content to the client device if the determination is that the client device is not entitled to the digital content. In the present embodiment, the content provider confirms the purchase of the digital content and authorizes the download.

Upon receipt of the digital content by the client device, the client device validates receipt of the digital content. For example, the client device may validate the receipt upon completion of the download of the digital content. The validation is then sent from the client device to the digital certification broker for storage thereof.

Figure 7:
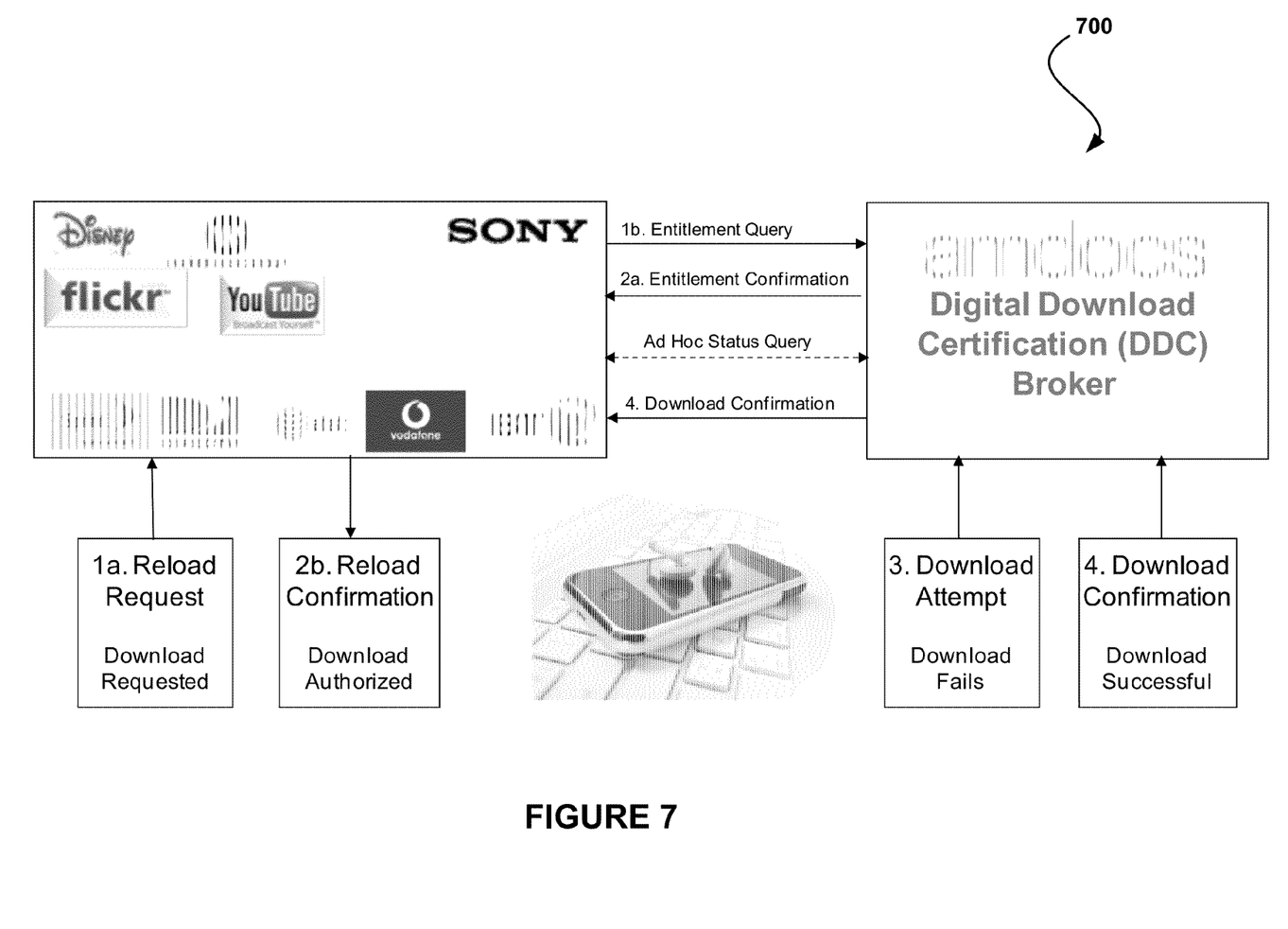
FIG. 7 illustrates a method in which a client device requests a reload of digital content, in accordance with yet another embodiment.

FIG. 7 illustrates a method 700 in which a client device requests a reload of digital content, in accordance with yet another embodiment. As an option, the method 700 may be carried out in the context of the details of FIGS. 1-5. Of course, however, the method 700 may be carried out in any desired environment. Yet again, the aforementioned definitions may equally apply to the description below.

As shown, a client device issues a request for a reload of a single piece of digital content to a content provider via a network of a service provider. The content provider receives the request and transmits an entitlement query to the digital certification broker [i.e. shown as digital download certification (DDC) broker].

The entitlement query requests an indication of whether the client device is entitled to the reload of the digital content. The digital certification broker determines whether the client device is entitled to the reload of the digital content (e.g. based on previous validations of receipt of the digital content by the client device, rules associated with the digital content, etc.), and responds to the content provider with the determination. The content provider may optionally send a status query to the digital certification broker before receipt of the determination made by the digital certification broker.

The content provider then either allows the reload (via download) of the digital content to the client device if the determination is that the client device is entitled to the reload of the digital content, or denies the reload of the digital content to the client device if the determination is that the client device is not entitled to the reload of the digital content. In the present embodiment, the content provider confirms the reload of the digital content and authorizes the reload.

Upon receipt of the digital content by the client device, the client device validates receipt of the digital content. For example, the client device may validate the receipt upon completion of the download of the digital content. The validation is then sent from the client device to the digital certification broker for storage thereof. Further, a download confirmation may be sent from the digital certification broker to the content provider.

Figure 8:
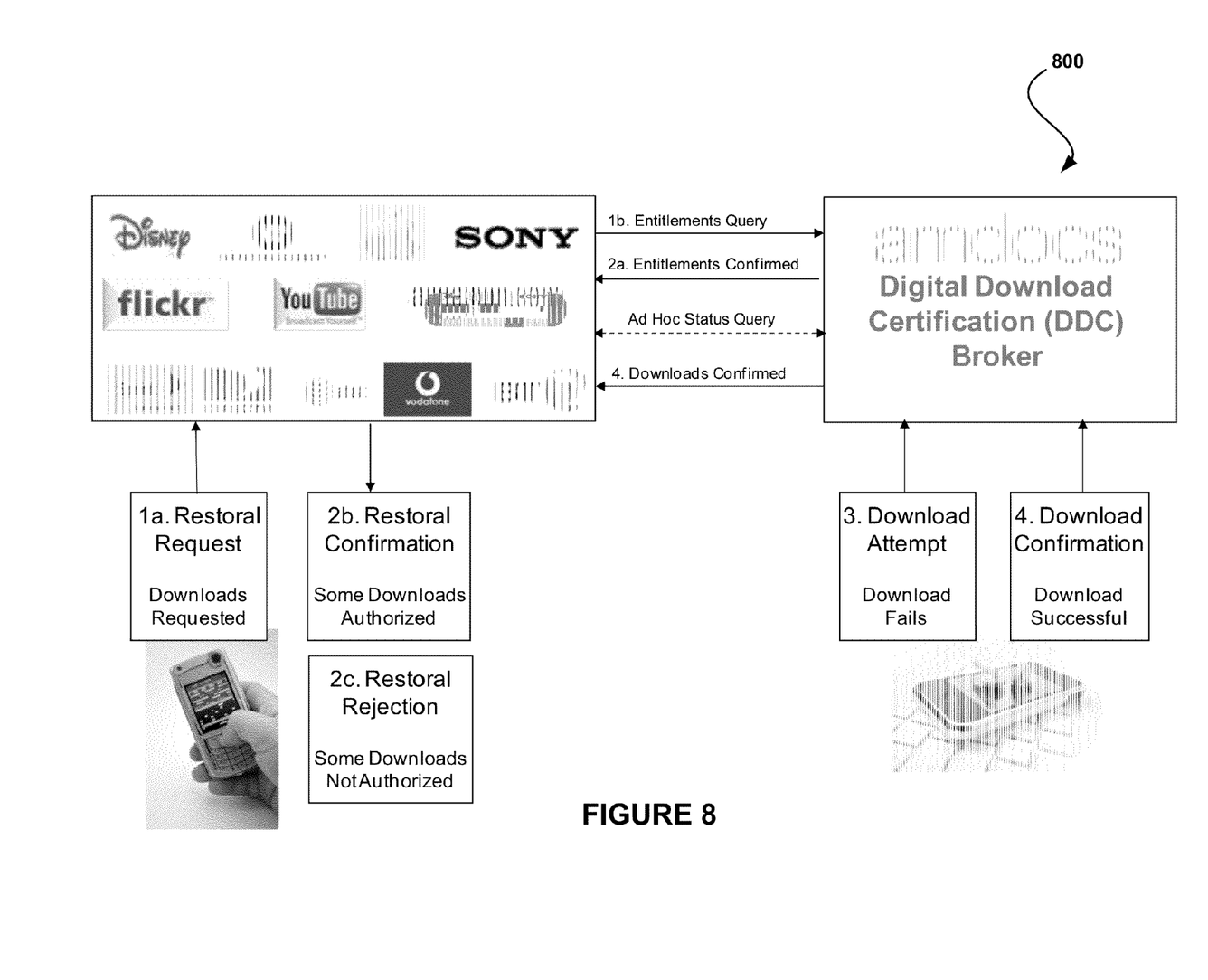
FIG. 8 illustrates a method in which a client device requests a restore of digital content, in accordance with yet another embodiment.

FIG. 8 illustrates a method 800 in which a client device requests a restore of digital content, in accordance with yet another embodiment. As an option, the method 800 may be carried out in the context of the details of FIGS. 1-5. Of course, however, the method 800 may be carried out in any desired environment. Yet again, the aforementioned definitions may equally apply to the description below.

As shown, a client device issues a request for a restore of multiple pieces of different digital content to a content provider via a network of a service provider. The content provider receives the request and transmits an entitlement query to the digital certification broker [i.e. shown as digital download certification (DDC) broker].

The entitlement query requests an indication of whether the client device is entitled to the restore of each of the different digital content. The digital certification broker determines whether the client device is entitled to the restore of the different digital content (e.g. based on previous validations of receipt of the digital content by the client device, rules associated with the digital content, etc.), and responds to the content provider with the determination for each of the different digital content. The content provider may optionally send a status query to the digital certification broker before receipt of the determination made by the digital certification broker.

The content provider then either allows the restore (via download) of the digital content to the client device if the determination is that the client device is entitled to the restore of the digital content, or denies the restore of the digital content to the client device if the determination is that the client device is not entitled to the restore of the digital content. In the present embodiment, the content provider confirms the restore of only a portion of the digital content and authorizes the restore with respect to such portion.

Upon receipt of the digital content by the client device, the client device validates receipt of the digital content. For example, the client device may validate the receipt upon completion of the download of the digital content. The validation is then sent from the client device to the digital certification broker for storage thereof. Further, a download confirmation may be sent from the digital certification broker to the content provider.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable storage medium executed by a processor, comprising:
   computer code for identifying a transmission of an instance of digital content over a network from a content provider to a client device, wherein the transmission is responsive to a request from the client device for the digital content;
   computer code for receiving, at a system remote from the client device, a message from the client device that is generated by the client device, where a content of the message generated by the client device is based on a comparison by the client device of the instance of the digital content received by the client device with digital content expected to be received by the client device, such that the message from the client device indicates that the client device has validated that the instance of the digital content transmitted to and received by the client device is the digital content requested, and expected to be received, by the client device; and
   computer code for validating receipt of the digital content by the client device utilizing the system remote from the client device, in response to the receipt of the message from the client device;
   wherein the message received at the system remote from the client device validates that the instance of the digital content transmitted to and received by the client device includes an attribute that matches an attribute received by the client device from the content provider independent of the instance of the digital content.

2. The computer program product of claim 1, wherein the digital content includes at least one of a movie, a song, and an application.

3. The computer program product of claim 1, wherein the content provider owns at least one intellectual property right to the digital content.

4. The computer program product of claim 1, wherein the transmission of the instance of the digital content includes a download of the digital content.

5. The computer program product of claim 1, wherein the request includes a purchase of the digital content by a user of the client device.

6. The computer program product of claim 1, wherein the transmission of the instance of the digital content is identified by confirming an entitlement to the digital content for at least one of the client device and a user of the client device, in response to the request for the digital content sent from the client device.

7. The computer program product of claim 6, wherein the entitlement is confirmed based on at least one rule associated with the digital content.

8. The computer program product of claim 7, wherein the at least one rule includes a limit on a number of instances of the digital content allowed to be simultaneously maintained by the user of the client device.

9. The computer program product of claim 7, wherein the at least one rule includes a limit on a number of allowed receipts of the digital content by the client device.

10. The computer program product of claim 1, wherein the receipt of the digital content is validated based on the message received from the client device.

11. The computer program product of claim 1, wherein the digital content expected to be received by the client device is identified by the client device using at least one attribute of the digital content, the at least one attribute including a size of the digital content.

12. The computer program product of claim 1, wherein the identifying the transmission of the instance of the digital content, and the validating the receipt of the digital content, are performed by the system remote from the client device which is separate from the content provider of the digital content.

13. The computer program product of claim 1, wherein the validation of the receipt of the digital content is utilized for applying rules to subsequent requests associated with the digital content sent by at least one of the client device and a user of the client device to determine entitlement to the digital content for the at least one of the client device and the user of the client device.

14. The computer program product of claim 1, further including computer code for:
  prior to identifying the transmission of the instance of the digital content over the network from the content provider to the client device:
  receiving, at the system remote from the client device, a query from the content provider including an identifier of the client device and requesting a notification from the system remote from the client device that the client device is entitled to the instance of the digital content,
  identifying, at the system remote from the client device, a rule for the digital content established by the content provider,
  determining, at the system remote from the client device, that the client device is entitled to the instance of the digital content based on the rule for the digital content established by the content provider, and
  sending, from the system remote from the client device to the content provider, confirmation that the client device is entitled to the instance of the digital content.

15. The computer program product of claim 1, further including:
  receiving from the content provider, at the system remote from the client device, a query for an indication of whether the instance of the digital content transmitted from the content provider was received by the client device, the query received in response to a request for a refund received from the client device at the content provider;
  determining that the receipt of the digital content by the client device was validated; and
  transmitting a response to the content provider, the response including a result indicating that the receipt of the digital content by the client device was validated, for use by the content provider in denying the refund to the client device based on a policy.

16. The computer program product of claim 1, further including updating a profile of a user of the client device for which the receipt of the digital content has been validated, for allowing the user to retrieve the digital content at another location.

17. The computer program product of claim 1, wherein the request from the client device for the digital content includes a media access control address of the client device as an identifier of the client device for determining whether the client device is entitled to the digital content.

18. A method, comprising:
  identifying a transmission of an instance of digital content over a network from a content provider to a client device, wherein the transmission is responsive to a request from the client device for the digital content;
  receiving, at a system remote from the client device, a message from the client device that is generated by the client device, where a content of the message generated by the client device is based on a comparison by the client device of the instance of the digital content received by the client device with digital content expected to be received by the client device, such that the message from the client device indicates that the client device has validated that the instance of the digital content transmitted to and received by the client device is the digital content requested, and expected to be received, by the client device; and
  validating receipt of the digital content by the client device utilizing the system remote from the client device, in response to the receipt of the message from the client device;
  wherein the message received at the system remote from the client device validates that the instance of the digital content transmitted to and received by the client device includes an attribute that matches an attribute received by the client device from the content provider independent of the instance of the digital content.

19. A system, comprising:
  a hardware processor for:
  identifying a transmission of an instance of digital content over a network from a content provider to a client device, wherein the transmission is responsive to a request from the client device for the digital content,
  receiving, at a system remote from the client device, a message from the client device that is generated by the client device, where a content of the message generated by the client device is based on a comparison by the client device of the instance of the digital content received by the client device with digital content expected to be received by the client device, such that the message from the client device indicates that the client device has validated that the instance of the digital content transmitted to and received by the client device is the digital content requested, and expected to be received, by the client device, and
  validating receipt of the digital content by the client device utilizing the system remote from the client device, in response to the receipt of the message from the client device;
  wherein the message received at the system remote from the client device validates that the instance of the digital content transmitted to and received by the client device includes an attribute that matches an attribute received by the client device from the content provider independent of the instance of the digital content.

20. The system of claim 19, wherein the processor is coupled to memory via a bus.

21. A computer program product embodied on a non-transitory computer readable storage medium executed by a processor, comprising:

computer code for requesting digital content at a client device;

computer code for receiving an instance of the digital content transmitted over a network from a content provider;

computer code for determining, at the client device, whether the instance of the digital content transmitted over the network to the client device is the digital content requested, and expected to be received, by the client device;

computer code for sending, to a system remote from the client device, a message generated by the client device, where a content of the message generated by the client device is based on a comparison by the client device of the instance of the digital content received by the client device with the digital content expected to be received by the client device, such that the message from the client device indicates that the client device has validated that the instance of the digital content transmitted over the network to the client device is the digital content requested, and expected to be received, by the client device, based on the determination at the client device;

wherein the message sent to the system remote from the client device validates that the instance of the digital content transmitted to and received by the client device includes an attribute that matches an attribute received by the client device from the content provider independent of the instance of the digital content.

* * * * *